May 5, 1942. R. H. GODDARD 2,281,971
FLUID COOLED BEARING
Filed June 14, 1940
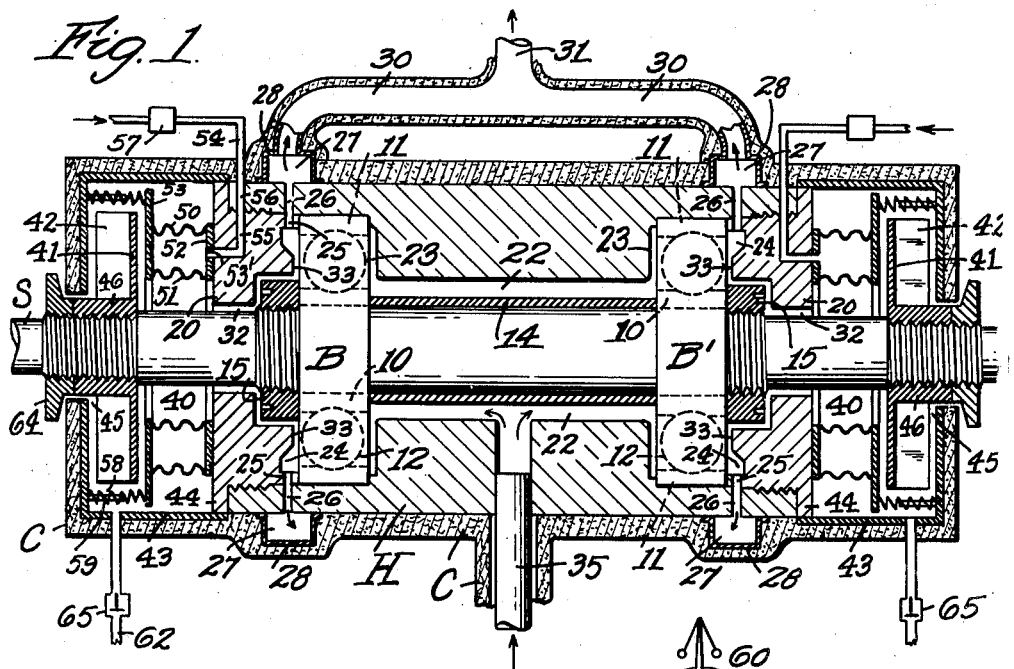
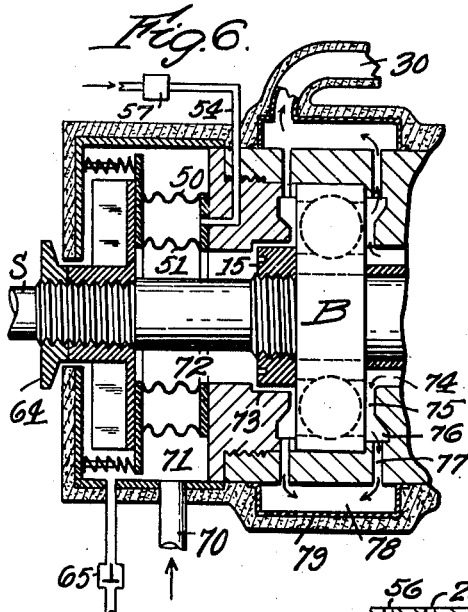
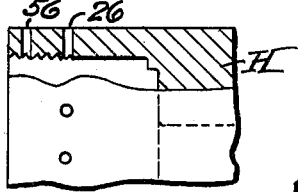
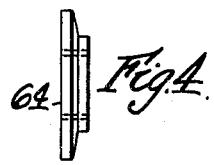
Inventor
Robert H. Goddard
By attorney
Chas. T. Hawley

UNITED STATES PATENT OFFICE 2,281,971

FLUID COOLED BEARING

Robert H. Goddard, Roswell, N. Mex.

Application June 14, 1940, Serial No. 340,420

11 Claims. (Cl. 308—77)

This invention relates to bearings which are to operate under conditions of extreme low temperature, as in liquid oxygen machinery, it being well known that the presence of very cold liquids, such as liquid oxygen, greatly increases the friction of surfaces which are in rubbing or sliding contact.

It is the general object of my invention to provide an improved bearing especially adapted for very low temperature use and in which overheating is prevented and friction losses are substantially reduced.

To the attainment of this object, I provide a bearing of ball or roller type in which the relatively moving parts are immersed in the cold liquid, as liquid oxygen, which circulates through the bearing and absorbs any heat generated by friction. Wear in the bearing parts is also substantially reduced, as the hardness of the metal surfaces increases at extreme low temperatures.

I also make special provision to prevent leakage of the cold liquid from the bearing, both when the rotated part is in motion and also when said part is at rest.

Preferred forms of the invention are shown in the drawing, in which

Fig. 1 is a sectional front elevation of a fluid-cooled bearing embodying my improvements;

Figs. 2, 3 and 4 are detail views of separate parts to be described;

Fig. 5 is a front elevation of a portion of a bearing housing, partly in section;

Fig. 6 is a partial sectional front elevation of a modified construction; and

Fig. 7 is a perspective view of a governor device to be described.

Referring to Figs. 1 to 5, I have shown a shaft S mounted in ball bearings B and B', which bearings are supported in a housing H. The bearings B and B' each comprise an inner race 10, an outer race 11 and interposed rolling elements 12 which are shown as balls but for which rollers may be substituted as desired.

The inner races 10 are positioned on the shaft S by a spacing sleeve 14 and are secured by nuts 15 threaded on the shaft S and engaging the outer faces of the races 10. The nuts 15 are preferably cylindrical as indicated in Fig. 3 and may be provided with spanner holes 16.

The outer races 11 are seated in recesses in the housing H and are secured therein by clamping members 20 (Figs. 1 and 2), which members are threaded into the housing H and engage the outer faces of the races 11.

A clearance space 22 is provided around the sleeve 14, and clearance spaces 23 are provided between the housing H and the inner faces of the bearings B and B'. An annular recess 24 is formed in the inner face of each nut 20 and is connected by passages 25 in the nut and 26 in the housing to a collecting space 27 in an annular channel member 28 mounted on the outside of the housing. The channels 28 for the two bearings B and B' are connected by branch pipes 30 to a common discharge pipe 31.

Clearance 32 is provided around the shaft S and nut 15 within each clamping member 20, and similar clearance 33 is provided between the inner face of the clamping member and the associated bearing. A supply pipe 35 connects into the clearance space 22 and provides a suitable supply of a very cold liquid, such as liquid oxygen.

When the shaft S is rotated, the bearings B and B' operate more or less as centrifugal pumps and draw the cold liquid in through the supply pipe 35 and clearance spaces 22 and 23. The liquid, after passing through the bearings, is then discharged through the annular recesses 24, passages 25 and 26, collecting members 28, branch pipes 30 and discharge pipe 31.

In this way, the balls or rollers 12 are submerged in liquid oxygen, which immediately absorbs any heat generated in the bearing and which also cools the engaging surfaces to a very low temperature. The hardness of the surfaces is thus substantially increased and wear is correspondingly decreased.

The clearance spaces 32 and 33 permit the liquid oxygen to enter the spaces 40 outside of the bearings B and B', but further escape of the liquid along the shaft S is prevented by providing discs 41 secured to and rotating with the shaft S and having radially extending vanes 42 on their outer faces, which vanes rotate in rather close clearance with respect to the end caps or casings 43 which fit snugly on the outer portions 44 of the nuts or clamping members 20. As the shaft S and discs 41 rotate, the centrifugal action of the vanes 42 will prevent any flow of liquid around the discs 41 and inward to the clearance spaces 45 adjacent the hubs 46 of the discs 41.

While the vanes 42 prevent endwise leakage when the shaft S is rotating, they obviously will not have any such effect when the shaft is at rest, and accordingly I make special provision for preventing leakage when the shaft S is not rotating.

For this purpose I provide concentric bellows members 50 and 51 for each bearing, the ends of which members are secured to open-center discs or washers 52 and 53. Each disc 52 is secured to the outer face of one of the nuts 20 and is provided with an opening 53' which communicates with a pipe 54 through passages 55 and 56 in the nut 20 and housing H respectively.

Each disc 53 is positioned adjacent one of the rotating discs 41 previously described but is normally spaced therefrom by a plurality of springs 58 mounted on studs 59 projecting inward from the end casing or cap 43. The springs 58 normally force the disc 53 away from the disc 41, so that no friction is developed between these parts.

Provision is made, however, to supply fluid pressure through the pipe 54 whenever the shaft S comes to rest, thus expanding the bellows members 50 and 51, pressing the disc 53 against the disc 41 and thereby preventing leakage of liquid oxygen from the ends of the housing.

In order to coordinate the shutting-off of pressure in the pipe 54 with the rotation of the shaft S, I provide an automatic control which may comprise a three-way valve 57 in the pipe 54, controlled by a governor 60 (Fig. 7) driven from the shaft S. When the shaft rotates, the governor actuates the valve 57 to vent the bellows members but when the shaft S comes to rest, the governor shifts the valve 57 to admit fluid under pressure through the pipe 54.

The housing H, caps 43, channel members 28 and pipes 30, 31 and 35 are all provided with a heat-insulating covering C, such as felt or other suitable insulating material.

When the shaft S is rotating, a certain amount of cold oxygen vapor will escape from the recess 24 and will work outward toward the axial opening at the end of the casing 43. During such passage of the cold oxygen vapor, it will collect and condense more or less water vapor, forming drops which may freeze at the point where the covering C approaches the shaft S. Also, when the shaft is at rest, any liquid oxygen trapped in the end casing 43 will evaporate, after which air may enter along the shaft, and the moisture in the air will form a coating of ice on all interior metal surfaces.

To avoid such freezing, either when running or at rest, I connect a pipe 62 into each casing 43, the other end of the pipe being connected into the upper part of a container of liquid oxygen (not shown). A small amount of liquid oxygen vapor will then pass continuously through the pipe 62 and will escape through the annular space between the covering C and the shaft S or hub 46.

A disc 64 (Figs. 1 and 4) of heat-insulating or non-conducting material is mounted on the shaft S just outside of this opening, with a tapered or conical inner face. The clearance space between the covering C and the rotating parts is quite small, so that any moisture condensing at this point will be blown away by the oxygen vapor, which, being evaporated from liquid oxygen, is completely dry and itself contains no water vapor.

The provision of the conical inner face of the disc 64 shortens the close clearance space and facilitates the blowing out of the condensed drops of moisture.

A check valve 65, closed by flow away from the space 40, permits flow of gas to take place through the pipe 62 as described, but prevents flow of liquid oxygen from the space 40 back into the liquid oxygen container when the shaft is turning and the pressure produced in 40 by the motion of the bearing parts exceeds the pressure in said container.

In the alternative construction shown in Fig. 6, I provide an additional supply of liquid oxygen through a pipe 70 which connects through annular spaces 71 and 72 and a clearance space 73 to the outer side of the ball or roller bearing, while the supply pipe 35 previously described connects through the clearance spaces 74 and 75 to the inner side. An additional annular recess 76 and connections 77 to the widened space 78 in the channel member 79 is also provided. This double construction gives a somewhat increased supply of cold liquid to the rotating bearing and is sometimes desirable under conditions of heavy duty.

Where the term "liquid oxygen" is used in the specification and claims, it is to be understood as including also other liquids having boiling points at a corresponding or lower range. The approximate low temperature rather than the chemical composition of the liquid is the significant factor.

My improved bearing has been fully tested under operating conditions and is found to perform effectively under conditions of extreme cold which have previously caused bearings to wear out with great rapidity.

Having thus described my invention and the advantages thereof, I do not wish to be limited to the details herein disclosed, otherwise than as set forth in the claims, but what I claim is:

1. A bearing operable at approximately the temperature of liquid oxygen and comprising a housing, rolling elements mounted therein, means to supply liquid oxygen to said bearing, means to circulate said liquid oxygen outwardly and radially around and between and in direct contact with said rolling elements by the centrifugal action of the moving parts of said bearing coacting with parts of said housing positioned at each side of said moving parts and spaced axially therefrom to provide restricted annular clearance spaces adjacent the inner and movable parts and outwardly increased clearance adjacent the outer and fixed parts of said bearing, and means to supply the liquid oxygen closely adjacent the rotated member and to discharge the liquid oxygen outside of said increased clearance space.

2. A bearing operable at approximately the temperature of liquid oxygen and comprising rolling elements supporting a rotated member, means to supply liquid oxygen to said bearing, means to circulate said liquid oxygen outwardly and radially around and between and in direct contact with said rolling elements, and means providing substantial clearance but preventing escape of said liquid oxygen from the ends of said bearing when said member is in rotation.

3. A bearing operable at approximately the temperature of liquid oxygen and comprising rolling elements supporting a rotated member, means to supply liquid oxygen to said bearing, means to circulate said liquid oxygen outwardly and radially around and between and in direct contact with said rolling elements, means providing substantial clearance but preventing escape of said liquid oxygen from the ends of said bearing when said member is in rotation, and additional means to prevent escape of liquid oxygen from the ends of said bearing when said member is at rest.

4. A bearing operable at approximately the temperature of liquid oxygen and comprising rolling elements supporting a rotated member in a housing, in combination, means to supply liquid oxygen to said bearing, means to circulate said liquid oxygen outwardly and radially in said housing around and between and in direct contact with said rolling elements, and means to prevent the freezing of atmospheric moisture between said member and end portions of said housing when said member is at rest.

5. In a bearing having rolling elements supporting a rotated member, that improvement which comprises a housing for said bearing, end casing members for said housing, means to circulate a very cold liquid in said housing and between and around said rolling elements, discs on said rotated member within said end casing members, and substantially radial vanes mounted on said discs to rotate closely adjacent the inner faces of said end casing members, said discs and vanes being effective to prevent leakage of said liquid from the ends of said bearing when said rotated member is in motion.

6. In a bearing having rolling elements supporting a rotated member, that improvement which comprises a housing for said bearing, end casing members for said housing, means to circulate a very cold liquid in said housing and around and between said rolling elements, discs on said rotated member within said end casing members, annular discs non-rotatably mounted adjacent the inner faces of said rotated discs, and means effective to force said annular discs against said rotated discs when said rotated member is at rest, thereby preventing leakage of said cold liquid from the ends of said bearing.

7. In a bearing having rolling elements supporting a rotated member, that improvement which comprises a housing for said bearing, end casing members for said housing, means to circulate a very cold liquid in said housing and around and between said rolling elements, discs on said rotated member within said end casing members, annular discs non-rotatably mounted adjacent the inner faces of said rotated discs, and automatically controlled pressure means effective to force said annular discs against said rotated discs when said rotated member is at rest, thereby preventing leakage of said cold liquid from the ends of said bearing 8. In a bearing operable at approximately the temperature of liquid oxygen and having rolling elements supporting a rotated member, that improvement which comprises a housing for said bearing, end casing members for said housing, means to circulate liquid oxygen in said housing and around and between and in direct contact with said rolling elements, and means to supply a dry vapor of said liquid oxygen at the end portions of said housing to eject condensed moisture therefrom.

9. In a bearing operable at approximately the temperature of liquid oxygen and having rolling elements supporting a rotated member, that improvement which comprises a housing for said bearing, end casing members for said housing, means to circulate liquid oxygen in said housing and around and between and in direct contact with said rolling elements, means to supply a dry vapor of said liquid oxygen at the end portions of said housing to eject condensed moisture therefrom, and means to prevent flow of the liquid oxygen from said casing to said vapor supplying means.

10. In a bearing having rolling elements supporting a rotated member, that improvement which comprises a housing for said bearing, end casing members for said housing, means to circulate a very cold liquid in said housing and between and around said rolling elements, means to supply a dry vapor of said cold liquid to the end casing members to eject condensed moisture therefrom, and discs mounted on said rotated member outside of but adjacent said end casing members, each disc having a conical surface adjacent the coacting casing member which acts as a slinger for the ejected condensed moisture.

11. A bearing operable at approximately the temperature of liquid oxygen and comprising a housing, rolling elements mounted therein, means to supply liquid oxygen to said bearing, and means to circulate said liquid oxygen outwardly and radially around and between and in direct contact with said rolling elements by the centrifugal action of the moving parts of said bearing coacting with parts of said housing positioned on each side of and extending outward substantially to the centers of said rolling elements and with restricted clearance relative thereto but with substantially increased clearance outwardly from said centers.

ROBERT H. GODDARD.